April 19, 1955     O. C. KALLIO     2,706,528
SNOW TRACTOR
Filed Feb. 28, 1952     3 Sheets-Sheet 1
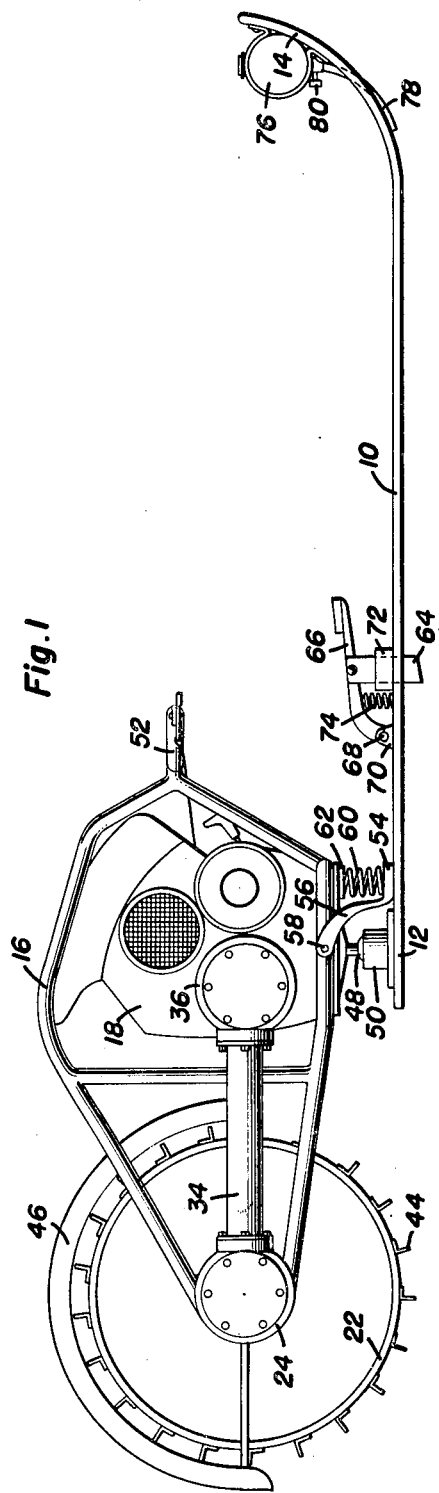
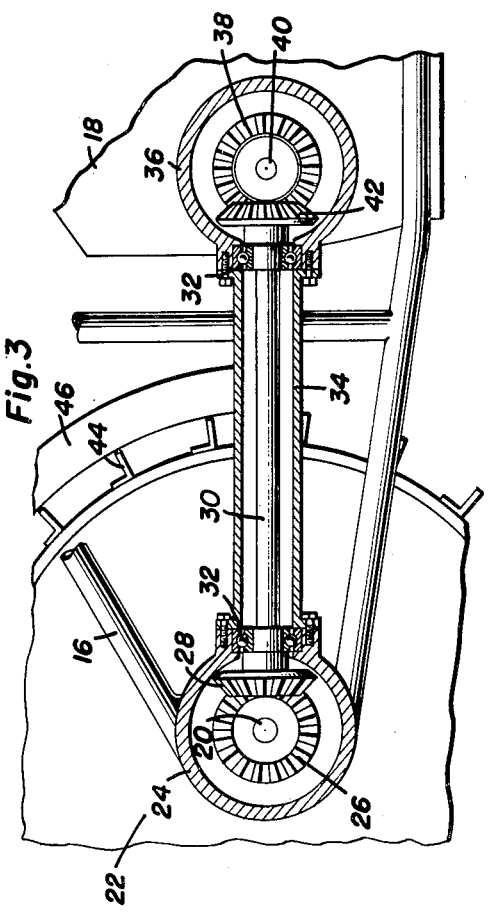
Oliver C. Kallio
INVENTOR.

April 19, 1955     O. C. KALLIO     2,706,528
SNOW TRACTOR
Filed Feb. 28, 1952     3 Sheets-Sheet 2
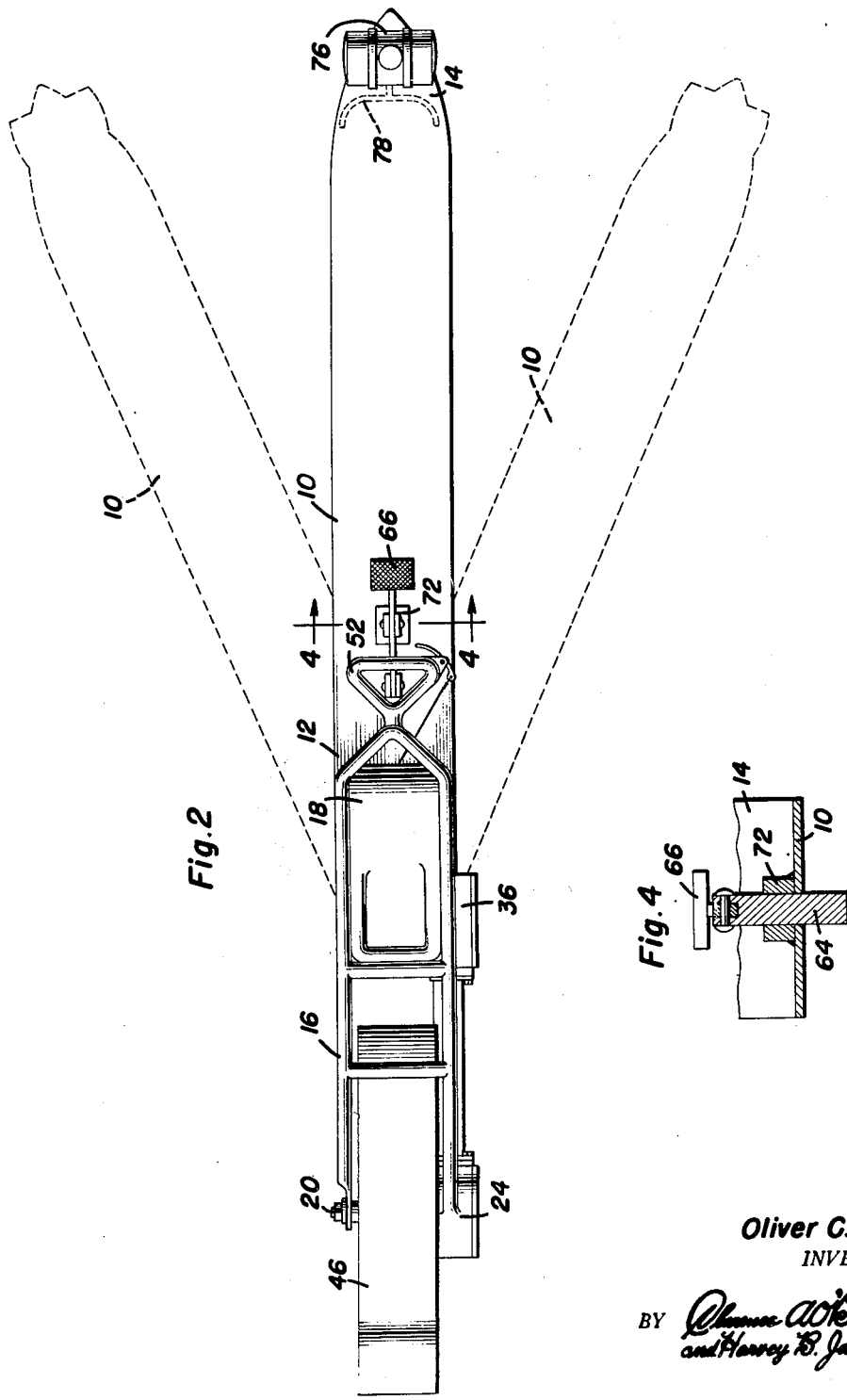
Oliver C. Kallio
INVENTOR.

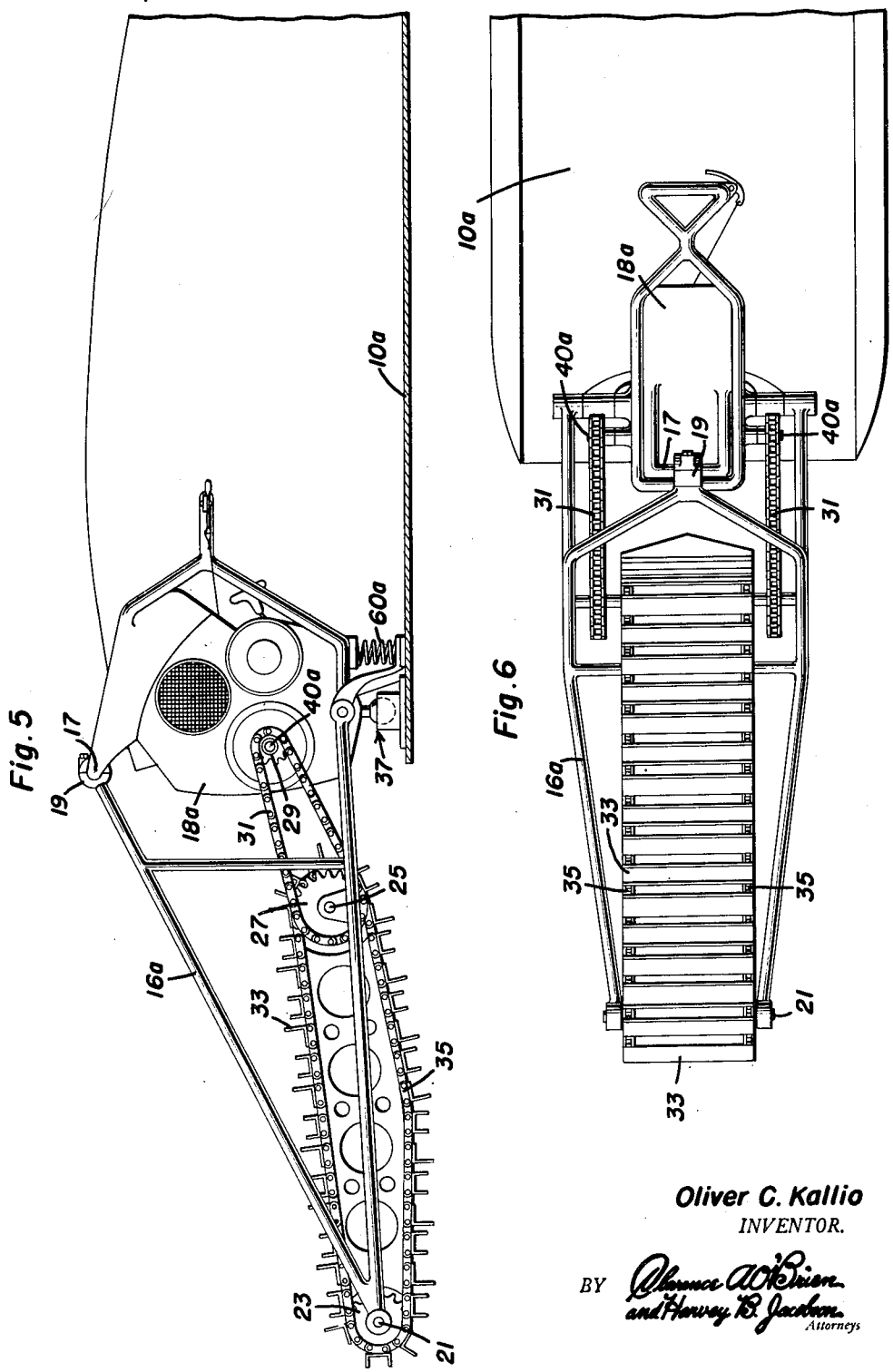

United States Patent Office 2,706,528
Patented Apr. 19, 1955

2,706,528

SNOW TRACTOR

Oliver C. Kallio, Ironwood, Mich.

Application February 28, 1952, Serial No. 273,925

2 Claims. (Cl. 180—5)

This invention relates to new and useful improvements in crawler type vehicles and the primary object of the present invention is to provide a device for carrying personnel, equipment, supplies and the like over snow and ice.

Another important object of the present invention is to provide a snow tractor having considerable maneuverability due to the specific mounting of a power means and traction member at the rear thereof.

Yet another object of the present invention is to provide a snow tractor having a universally mounted power operated traction member at the rear thereof that is manually moved into or out of snow engaging position by a single operator standing or seated on the tractor.

A further object of the present invention is to provide a snow tractor that is extremely small and compact in structure and which includes a foot operated braking element, whereby forward progress of the snow tractor may be arrested in a convenient manner.

A still further aim of the present invention is to provide a snow tractor that is simple and practical in construction, strong and reliable in use, efficient and durable in operation, inexpensive to manufacture, and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a side elevational view of the present invention;

Figure 2 is a plan view of Figure 1;

Figure 3 is an enlarged fragmentary detail vertical sectional view of Figure 1;

Figure 4 is an enlarged detail vertical sectional view taken substantially on the plane of section line 4—4 of Figure 2;

Figure 5 is a side view partly in section and partly in elevation of the invention in modified form; and, Figure 6 is a plan view of Figure 5.

Referring now to the drawings in detail, wherein for the purpose of illustration, there is disclosed a preferred embodiment of the present invention, the numeral 10 designates an elongated flat slide or skid having a rear end portion 12 and upwardly curved forward end portion 14.

A tubular frame 16 is disposed at the rear end portion of the slide 10 and supports a power plant or internal combustion engine 18 of well known construction and a driven shaft 20 having one end attached to a traction member or drum 22 and its other end positioned in a gear casing 24 fixed to the frame. The end of the shaft 20 within casing 24 fixedly supports a beveled gear 26 that meshes with a second beveled gear 28 in casing 24 that is fixed to a longitudinal shaft 30.

Shaft 30 is rotatably supported in bearings 32 at the ends of a bearing tube 34 whose ends are secured to casing 24 and a second casing 36 forming part of the engine 18. A beveled gear 38 on the drive shaft 40 of engine 18 meshes with a beveled gear 42 on the shaft 30, both gears 38 and 42 being enclosed within casing 36.

A plurality of spaced parallel cleats 44 are fixed to the outer periphery of the drum 22 to sequentially engage the snow as the drum 22 is driven clockwise by the engine 18 when viewing Figure 1. A fender 46 attached to the frame extends over the upper portion of the drum 22.

Means is provided for mounting the frame 16 on the rear end portion 12 of the slide 10. This means comprises a ball member 48 fixed to and depending from the forward portion of frame 16 below engine 18. A socket element 50 fixed to and rising from end portion 12 receives the ball member therein, whereby a hand grip 52 at the front end of the frame may be manually manipulated for raising, lowering or turning the frame to the right or left.

A spring seat 54 is disposed below the front end of the frame and is located in front of the ball and socket 48, 50. A pair of upwardly and rearwardly curved arms 56 are fixed to the seat 54 and their upper rear ends are pivoted to frame 16, as at 58. A coil spring 60 is positioned in the seat 54 and its upper end enters a second seat 62 fixed to frame 16 to yieldingly urge the rear end of the frame downwardly and the traction member into snow engaging position.

Braking means is provided for the slide 10 and includes a vertically slidable ground or snow engaging member 64 whose upper end is pivoted to a foot pedal 66 secured to the slide 10 through the medium of a pin 68 carried by ears 70 on the slide 10. A vertical guide 72 on the slide 10 registers with an aperture in the slide 10 and the aperture and guide slidably receive member 64. A spring 74 urges the foot pedal 66 and member 64 to a raised position.

The upwardly curved forward end portion 14 of the slide 10 supports a tank 76 whose outlet tube 78 extends downwardly through end 14 and against the undersurface thereof. A manually actuatable valve 80 is provided in conduit or tube 78. The tank 76 may be filled with fuel-oil so that the front end of the slide may be sprayed before a stop is made to prevent freezing of block metal to the snow. This solution will also increase speed during sticky snow conditions.

Reference is now directed to Figures 5 and 6, wherein there is illustrated the present invention in modified form. In this embodiment the frame 16a is removably supported at its forward upper portion to the hand grip 17 of engine 18a by a split clamp 19.

Frame 16a is elongated and extends rearwardly from slide 10a. The rear end of frame 16a rotatably supports a rear transverse shaft 21 having sprockets 23 thereon. An intermediate portion of the frame 16a rotatably supports a second transverse shaft 25 carrying two pairs of sprockets 27. The drive shaft 40a of engine 18a supports drive sprockets 29 that are connected to a pair of the sprockets 27 by endless drive sprocket chains 31. Cleats 33 are terminally fixed to the chains 31. The remaining pair of sprockets 27 are connected to sprockets 23 by endless chains 35.

Frame 16a is universally connected to the slide 10a in the same manner as frame 16 is connected to slide 10, as at 37, and spring 60a urges the rear end of the frame downwardly and the traction member into snow engaging position.

In practical use of the present invention, the frame 16 or 16a may be readily maneuvered for steering the slide. The frame may be raised or lowered for controlled speed or the clutch of the engine may be actuated to reduce movement of the slide. The braking means may be actuated to brake forward movement of the slide.

Having described the invention, what is claimed as new is:

1. A snow tractor comprising an elongated slide having forward and rear ends, a supporting frame at the rear end of the slide and having a rear portion overhanging the rear end of the slide, a power plant mounted on the frame, a rotatable traction member rotatably mounted on the rear portion of the frame and operatively connected to the power plant, a universal coupling between the frame and the rear end of the slide permitting movement of the traction member selectively into and out of snow engaging position, a spring holder pivotally mounted on the frame and engaged against the slide, and a spring carried by the holder and engaging the frame forwardly of said universal coupling and yieldingly urging the holder against the slide and the traction member into snow engaging position, said spring holder comprising a seat spaced forwardly of said universal coupling, hanger arms fixed at their lower ends to the seat and pivoted at their upper ends to the frame on a pivot spaced longitudinally of said seat.

2. A snow tractor comprising an elongated slide, a frame universally connected to the rear end of said slide, a snow engaging traction wheel rotatably mounted on said frame, a motor mounted on said frame and drivingly connected to said wheel, and spring means interposed between said frame and slide and forwardly of said slide and frame connection for normally urging said wheel into engagement with the snow about said connection, said motor being positioned substantially directly above said universal connection, said spring means including a spring guide pivotally secured to said frame and frictionally engaging said slide at a point spaced longitudinally from said universal connection between said frame and slide and a compression spring disposed between said frame and said guide and engaging said guide adjacent its point of contact with said slide.

References Cited in the file of this patent

UNITED STATES PATENTS

| | | |
|---|---|---|
| 817,071 | King et al. | Apr. 3, 1906 |
| 1,293,958 | Smedshammer | Feb. 11, 1919 |
| 1,530,223 | Young | Mar. 17, 1925 |
| 1,682,051 | Pearson | Aug. 28, 1928 |
| 2,289,768 | Fehrenbacher | July 14, 1942 |
| 2,450,566 | Schmid | Oct. 5, 1948 |
| 2,528,890 | Lawrence | Nov. 7, 1950 |

FOREIGN PATENTS

| | | |
|---|---|---|
| 116,720 | Great Britain | Jan. 2, 1919 |